United States Patent
Kawata et al.

(10) Patent No.: US 11,190,662 B2
(45) Date of Patent: Nov. 30, 2021

(54) IMAGE PROCESSING APPARATUS FOR DETECTING A STANDING-UP MOTION TO CHANGE PRINT MODE AND NON-TRANSITORY COMPUTER READABLE MEDIUM

(71) Applicant: FUJIFILM BUSINESS INNOVATION CORP., Tokyo (JP)

(72) Inventors: Yuichi Kawata, Kanagawa (JP);
Kensuke Okamoto, Kanagawa (JP);
Hideki Yamasaki, Kanagawa (JP);
Yoshifumi Bando, Kanagawa (JP);
Ryoko Saitoh, Kanagawa (JP); Tomoyo Nishida, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 338 days.

(21) Appl. No.: 16/027,688

(22) Filed: Jul. 5, 2018

(65) Prior Publication Data
US 2019/0028602 A1     Jan. 24, 2019

(30) Foreign Application Priority Data
Jul. 19, 2017    (JP) .............................. JP2017-139640

(51) Int. Cl.
G06F 3/12    (2006.01)
H04N 1/00    (2006.01)
G06K 9/00    (2006.01)

(52) U.S. Cl.
CPC ....... *H04N 1/00896* (2013.01); *G06F 3/1213* (2013.01); *G06F 3/1221* (2013.01); *G06F 3/1229* (2013.01); *G06K 9/00342* (2013.01); *G06K 9/00362* (2013.01); *G06F 3/1204* (2013.01)

(58) Field of Classification Search
CPC .... G06F 3/1204; G06F 3/1213; G06F 3/1221; G06F 3/1229; G06K 9/00342; G06K 9/003632
USPC ......................................... 358/1.1–1.18, 474
See application file for complete search history.

(56) References Cited

U.S. PATENT DOCUMENTS

| | | | |
|---|---|---|---|
| 10,182,179 B2 * | 1/2019 | Kosaka | G06F 3/1267 |
| 2014/0376941 A1 * | 12/2014 | Okuzono | G03G 15/5091 |
| | | | 399/75 |
| 2018/0139342 A1 * | 5/2018 | Yamaguchi | H04N 1/00973 |

FOREIGN PATENT DOCUMENTS

| | | |
|---|---|---|
| JP | 2013162313 A | 8/2013 |
| JP | 2016-204359 A | 12/2016 |
| JP | 2018065276 | * 4/2018 |

OTHER PUBLICATIONS

Apr. 20, 2021 Office Action issued in Japanese Patent Application No. 2017-139640.

* cited by examiner

*Primary Examiner* — Gabriel I Garcia
(74) *Attorney, Agent, or Firm* — Oliff PLC

(57) ABSTRACT

An image processing apparatus includes a detector and a change unit. The detector detects a standing-up motion of a person after receipt of a print instruction. The change unit changes from a low-power consumption mode to a printing mode in response to detection of the standing-up motion, the printing mode being a ready-to-print mode.

6 Claims, 7 Drawing Sheets

IMAGE PROCESSING APPARATUS FOR DETECTING A STANDING-UP MOTION TO CHANGE PRINT MODE AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-139640 filed Jul. 19, 2017.

BACKGROUND

(i) Technical Field

The present invention relates to an image processing apparatus and a non-transitory computer readable medium.

(ii) Related Art

Some image processing apparatuses have a low-power consumption mode for operating with low power consumption as a power-saving function.

SUMMARY

According to an aspect of the invention, there is provided an image processing apparatus including a detector and a change unit. The detector detects a standing-up motion of a person after receipt of a print instruction. The change unit changes from a low-power consumption mode to a printing mode in response to detection of the standing-up motion, the printing mode being a ready-to-print mode.

BRIEF DESCRIPTION OF THE DRAWINGS

An exemplary embodiment of the present invention will be described in detail based on the following figures, wherein.

DETAILED DESCRIPTION

Before describing an exemplary embodiment of the present invention, an overview of the exemplary embodiment or an image processing apparatus according to this exemplary embodiment will be described first. This description is provided for purposes of facilitating understanding this exemplary embodiment.

Instead of printing a document immediately upon receipt of a print instruction (also referred to as a print job), an image processing apparatus such as a multifunction apparatus (an image processing apparatus having two or more of functions such as scanner, printer, copying, and facsimile functions) authenticates a user before printing a document in accordance with a print instruction given by the user to ensure that no printed document is left unattended at the image processing apparatus. This allows the user to check their printed document, which leads to a reduction in the risk of any other person picking up the printed document.

In addition, to reduce power consumption, the image processing apparatus has a low-power consumption mode (also referred to as a power conservation mode) and is provided with a mechanism for returning to a printing mode (also referred to as a print mode or a standby mode) from the low-power consumption mode when a user who is using the image processing apparatus is detected using a motion sensor based on infrared or any other sensing technology.

In a technique disclosed in Japanese Unexamined Patent Application Publication No. 2013-162313, an image processing apparatus operates in cooperation with mobile terminals, and thus every user needs to carry a mobile terminal. In addition, a motion sensor is insufficient to determine whether to return to the printing mode since it is difficult to determine whether to return to the printing mode unless the user approaches the image processing apparatus. Thus, it takes a certain time for the user to wait for the image processing apparatus to return to the printing mode. For example, a motion sensor has a typical sensing range of about 2 m, and it is difficult for the image processing apparatus to return to the printing mode until the user approaches the image processing apparatus within that distance. This may cause the user to wait for the image processing apparatus to be ready for printing.

There are also available image processing apparatuses equipped with a camera for face authentication and the like.

An exemplary embodiment of the present invention will be described hereinafter with reference to the drawings.

Figure 1:
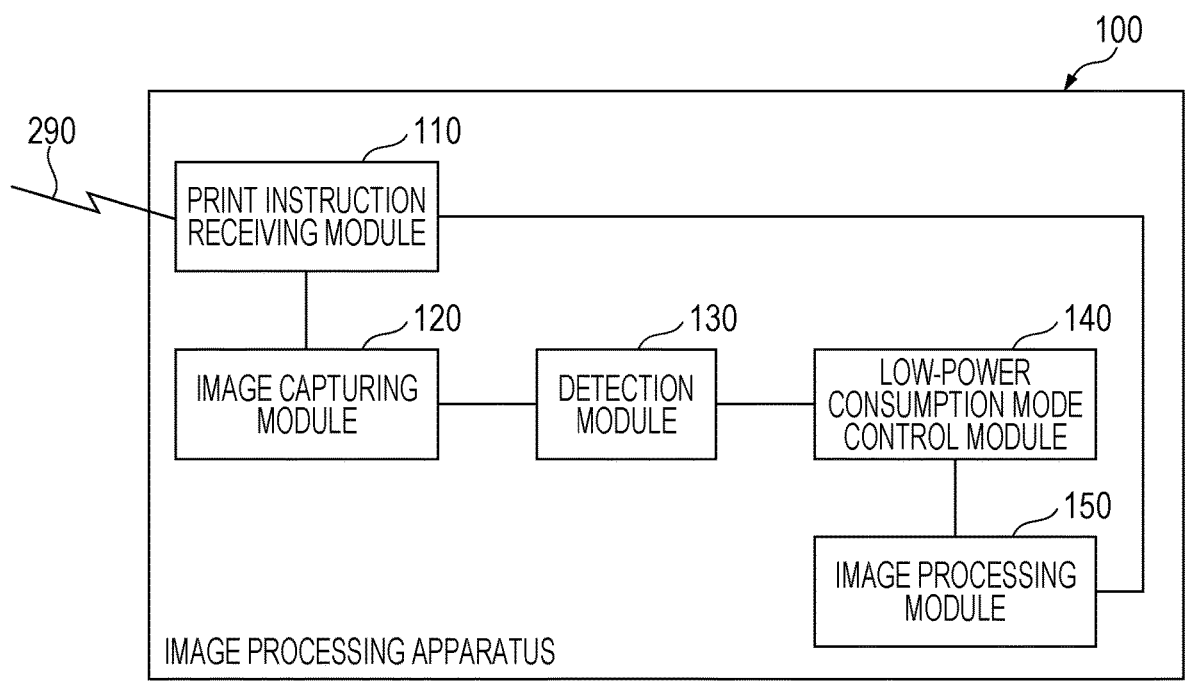
FIG. 1 is a conceptual module configuration diagram illustrating an example configuration of an image processing apparatus according to the exemplary embodiment.

FIG. 1 is a conceptual module configuration diagram illustrating an example configuration of an image processing apparatus 100 according to this exemplary embodiment.

The term "module" generally refers to a logically separable component such as in software (computer program) or hardware. Thus, each module in this exemplary embodiment refers not only to a module in a computer program but also to a module in a hardware configuration. Accordingly, this exemplary embodiment is also directed to a computer program for causing a computer to function as these modules (i.e., a program for causing the computer to execute the respective procedures, a program for causing the computer to function as the respective units, or a program for causing the computer to implement the respective functions), as well as to a system and a method. While the expressions "store data" and "data is stored" and their equivalent expressions are used for convenience of description, such expressions have a meaning of making a storage device store data or controlling a storage device to store data if an exemplary embodiment is directed to a computer program. While each module may be given a single function, each module may be constituted by a single program or multiple modules may be constituted by a single program in actual implementation. Conversely, a single module may be constituted by multiple programs. In addition, multiple modules may be executed by a single computer, or a single module may be executed by multiple computers in a distributed or parallel environment. As an alternative, a single module may include another module. In the following, the term "connection" refers not only to a physical connection but also to a logical connection (such as exchanging of data, sending instructions, and a reference relationship between data). The term "predetermined" refers to a state in which certain information is determined before intended processing is to be performed, and is used to include not only a state in which such information is determined at a time point prior to the commencement of processing according to this exemplary embodiment but also a state in which the information is determined at a time point prior to intended processing even after the processing according to this exemplary embodiment has commenced, depending on the condition or the state at that time or depending on the condition or the state until that time. When there are multiple "predetermined values", the values may be different or two or more (or all) of the values may be identical. A description "if A, (then) B" is used to mean: "it is determined whether or not A, and B if it is determined that A" unless the determination of whether or not A is required. In addition, things enumerated, such as "A, B, and C", are exemplary unless otherwise noted, and are used to indicate that only one of them has been selected (for example, only A).

Furthermore, the term "system", "apparatus", or "device" is used to include a configuration in which multiple computers, hardware components, apparatuses, devices, or other suitable elements are connected to each other via a communication medium such as a network (including one-to-one communication connections), and what is implemented by a single computer, hardware component, apparatus, device, or suitable element. The terms "apparatus", "device", and "system" are used synonymously. It is to be understood that the term "system" does not include what is merely a social "mechanism" (social system), which is a kind of artificial arrangement.

Moreover, target information is read from a storage device for each processing operation that is to be performed by an individual module or, if multiple processing operations are to be performed within a module, for each of the multiple processing operations. After the processing is performed, the result of the processing is written to the storage device. Thus, the reading of information from the storage device before the processing of the information is to be performed and the writing of information to the storage device after the processing of the information has been performed are not described in some cases. Examples of the storage device used here may include a hard disk, a random access memory (RAM), an external storage medium, a storage device connected via a communication line, and a register within a central processing unit (CPU).

The image processing apparatus 100 according to this exemplary embodiment is configured to return to a printing mode from a low-power consumption mode. As in an example illustrated in FIG. 1, the image processing apparatus 100 includes a print instruction receiving module 110, an image capturing module 120, a detection module 130, a low-power consumption mode control module 140, and an image processing module 150.

The image processing apparatus 100 has the low-power consumption mode and the printing mode (also referred to as a print mode or a standby mode). The low-power consumption mode is a state in which the image processing apparatus 100 is waiting to print a document. The printing mode is a print-ready state. In the low-power consumption mode, the image processing apparatus 100 consumes less power than in the printing mode. In the printing mode, an image forming unit is preheated and is ready for use, or the image forming unit is in use. The low-power consumption mode indicates states other than the printing mode. The low-power consumption mode may include modes of multiple stages. For example, the low-power consumption mode may include a low power mode in which the image processing apparatus 100 operates with a heater unit being kept at low temperature and with a motor not in operation, and an auto-off mode (also referred to as a sleep mode) in which the main power switch of the image processing apparatus 100 is turned off to achieve the most power conservation.

The print instruction receiving module 110 is connected to the image capturing module 120 and the image processing module 150. The print instruction receiving module 110 receives a print instruction (also referred to as a print job) from a user terminal 200 (described below with reference to FIGS. 2A and 2B) via a communication line 290.

The image capturing module 120 is connected to the print instruction receiving module 110 and the detection module 130. The image capturing module 120 captures a first image after the print instruction receiving module 110 has received a print instruction, and then captures a second image after a predetermined period elapses after the capturing of the first image. After receipt of a print instruction from a user, the image capturing module 120 performs an image capturing operation to detect the user approaching the image processing apparatus 100 to obtain a document that is printed in accordance with the print instruction. The first image to be captured "after receipt of a print instruction" may be an image of the user before the user who has issued the print instruction stands up. For example, (1) immediately after receipt of a print instruction, (2) after a predetermined time elapses (such as 5 seconds later) after receipt of a print instruction, or (3) when an image being captured by the image capturing module 120 changes after receipt of a print instruction, the first image may be captured. In the case (3), the image capturing module 120 may always capture images or may start capturing an image immediately after receipt of a print instruction. During the "predetermined period" from the capturing of the first image to the capturing of the second image, an image or multiple images of the user after the user who has issued a print instruction stands up may be captured.

The image capturing module 120 may use the camera for face authentication, which is included in the image processing apparatus 100.

The image capturing module 120 may be a digital camera configured to capture a still image or may be a camera configured to capture a moving image. The image capturing module 120, which is a camera configured to capture a moving image, continuously captures images up to the second image after capturing the first image.

The detection module 130 is connected to the image capturing module 120 and the low-power consumption mode control module 140. The detection module 130 detects a standing-up motion of a person after receipt of a print instruction from the person.

The detection module 130 may detect a standing-up motion of a person by, for example, comparing first and second images captured by using the image capturing module 120.

Further, when one or more image portions in the second image are different from one or more corresponding image portions in the first image and are arranged vertically, the detection module 130 may detect a standing-up motion of a person.

Further, when the one or more different image portions include a person, the detection module 130 may detect a standing-up motion of the person.

The low-power consumption mode control module 140 is connected to the detection module 130 and the image processing module 150. The low-power consumption mode control module 140 changes from the low-power consumption mode to the printing mode, which is a ready-to-print mode, if the detection module 130 detects a motion (detects a standing-up motion).

The image processing module 150 is connected to the print instruction receiving module 110 and the low-power consumption mode control module 140. After the low-power consumption mode control module 140 changes to the printing mode, the image processing module 150 starts a printing process in response to a print instruction received by the print instruction receiving module 110. If a login process based on face authentication or the like is necessary, the image processing module 150 may start image processing to perform the printing process (processing for generating, on a memory, a print image to be printed) before the login process is successfully performed. When the login process is successful, the image processing module 150 may identify the user who has logged in as a user from whom the print instruction has been received by the print instruction receiving module 110 and then perform a process for forming an image on a sheet. This is because a user who stands up immediately after transmitting a print instruction is more likely to pick up a printed document and it is desirable to reduce the waiting time of the user.

Figure 2A:
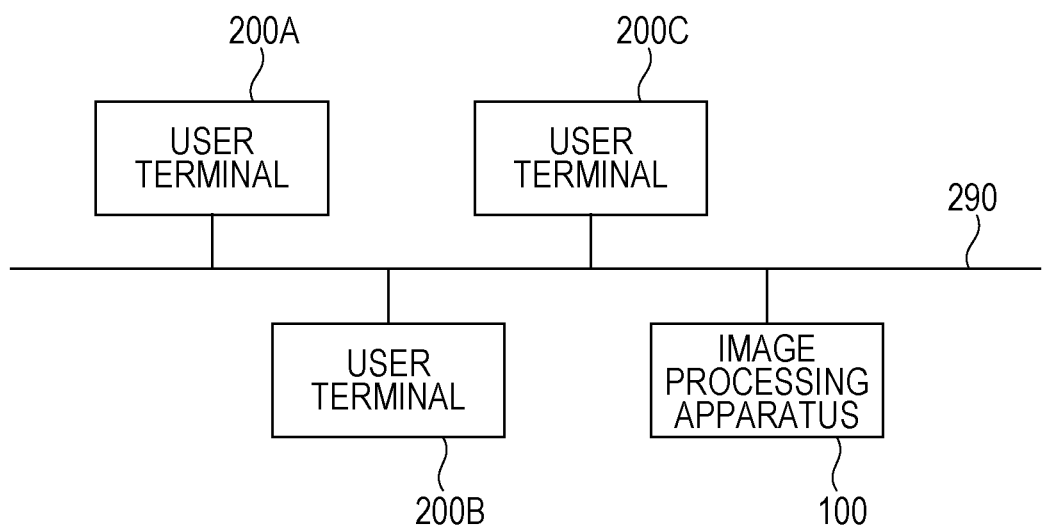
FIGS. 2A and 2B illustrate example configurations of a system that uses the image processing apparatus according to the exemplary embodiment.
Figure 2B:
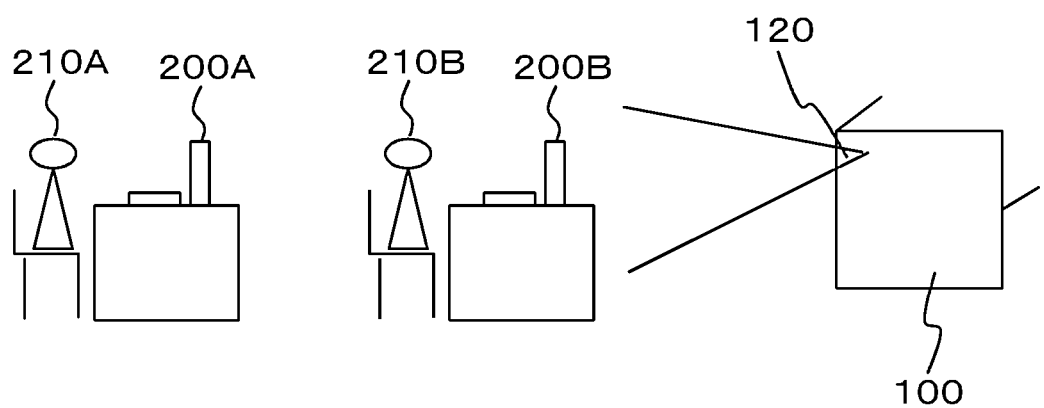

FIGS. 2A and 2B illustrate example configurations of a system that uses the image processing apparatus 100 according to this exemplary embodiment.

In the example illustrated in FIG. 2A, the image processing apparatus 100 and user terminals 200, namely, a user terminal 200A, a user terminal 200B, and a user terminal 200C, are connected to one another via the communication line 290. The communication line 290 may be wireless or wired, or a combination of the two, and may be, for example, the Internet, an intranet, or the like as a communication infrastructure. A print instruction is transmitted from any one of the user terminals 200 to the image processing apparatus 100 via the communication line 290.

The example illustrated in FIG. 2B illustrates positional relationships among the user terminal 200A, a user 210A, the user terminal 200B, a user 210B, and the image processing apparatus 100 within an office. In the following, the user terminal 200A and the user terminal 200B are collectively referred to as the user terminals 200 unless they are individually identified, and the user 210A and the user 210B are collectively referred to as the users 210 unless they are individually identified. The users 210 use the user terminals 200 while sitting down. Each of the users 210 sends a print instruction to the image processing apparatus 100 by using their user terminal 200. One of the users 210 who has issued a print instruction generally stands up and moves to the image processing apparatus 100 immediately after sending the print instruction to pick up a printed document. The image capturing module 120 of the image processing apparatus 100 is oriented toward the users 210, who are sitting down, and is capable of capturing images of the users 210. The image processing apparatus 100, when not in use, is kept in the low-power consumption mode. After receiving a print instruction from one of the users 210, the image processing apparatus 100 changes from the low-power consumption mode to the printing mode when the image processing apparatus 100 detects a standing-up motion of the user 210. The image processing apparatus 100 is ready for printing in accordance with the print instruction when the user 210 goes to the image processing apparatus 100.

Figure 3:
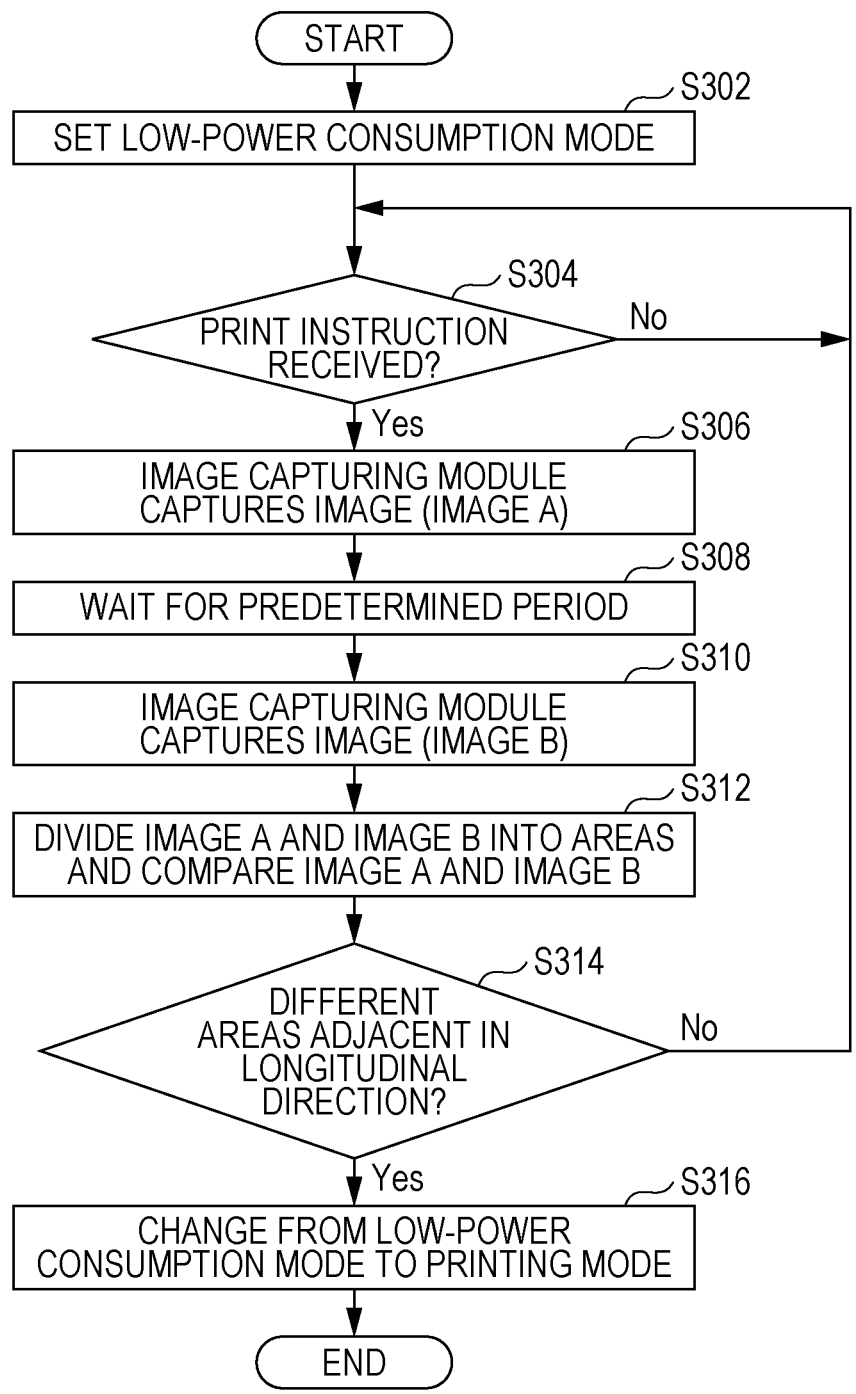
FIG. 3 is a flowchart illustrating an example process performed by the image processing apparatus according to the exemplary embodiment.

FIG. 3 is a flowchart illustrating an example process performed by the image processing apparatus 100 according to the exemplary embodiment.

In step S302, the low-power consumption mode control module 140 sets the low-power consumption mode. For example, the image processing apparatus 100, which is not in use for a predetermined time, enters the low-power consumption mode.

In step S304, it is determined whether the print instruction receiving module 110 has received a print instruction from one of the user terminals 200. If a print instruction has been received, the process proceeds to step S306. Otherwise, the image processing apparatus 100 waits for a print instruction to be received.

Figure 4A:
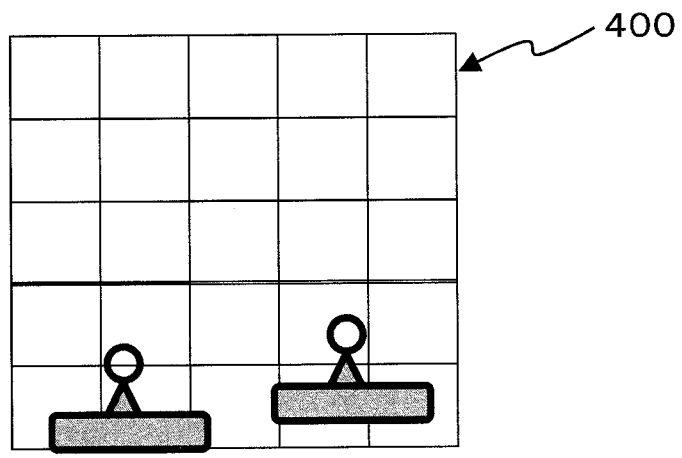
FIGS. 4A and 4B illustrate an example process performed by the image processing apparatus according to the exemplary embodiment.

In step S306, the image capturing module 120 captures an image (image A). For example, as illustrated in FIG. 4A, an image A (400) is captured. The image A (400) includes two users 210, who are sitting down.

In step S308, the image capturing module 120 waits for a predetermined period.

Figure 4B:
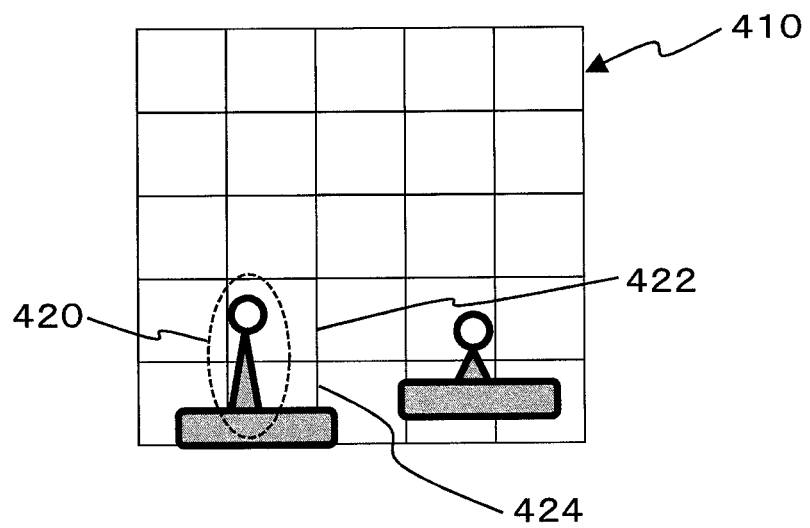

In step S310, the image capturing module 120 captures an image (image B). For example, as illustrated in FIG. 4B, an image B (410) is captured. The image B (410) includes two users 210, one of whom is standing.

In step S312, each of the image A and the image B is divided into areas and the image A and the image B are compared with each other. In the example described above, the image A (400) and the image B (410) are each divided into areas and different areas of the image A (400) and the image B (410) are extracted. In the example in FIGS. 4A and 4B, each of the image A (400) and the image B (410) is divided into 5×5=25 areas. Since one of the users 210 who were sitting down stands up, the image B (410) includes an image 420 of the user 210 standing up. In the image 420, a transition area 422 and a transition area 424, which are an area represented as (2, 2) and an area represented as (2, 1), respectively, when the lower left corner area is represented as (1, 1), are extracted as different areas. Since the different areas (the transition area 422 and the transition area 424) are adjacent in the longitudinal direction (different image portions are arranged vertically), "Yes" is determined in step S314. Each different area may be extracted by comparing corresponding areas of the two images and determining that an area in which the proportion of pixels having different values from the pixels in the corresponding area is greater than or equal to a predetermined threshold is a different area.

In addition, the image A and the image B may be compared with each other and a movement of an object from a low position to a high position may be detected. That is, an upward movement of the face of a user standing up may be detected. If the detection is successful, the process may proceed to step S316. Otherwise, the process may return to step S304.

In step S314, it is determined whether the different areas are adjacent in the longitudinal direction. If the different areas are adjacent in the longitudinal direction, the process proceeds to step S316. Otherwise, the process returns to step S304.

In step S316, the low-power consumption mode control module 140 changes from the low-power consumption mode to the printing mode.

In the processing of step S316, a process for preparing a printing process in accordance with the print instruction received in step S304 (such as a process for generating, on a memory, a print image from a document to be printed) may be performed.

Figure 5:
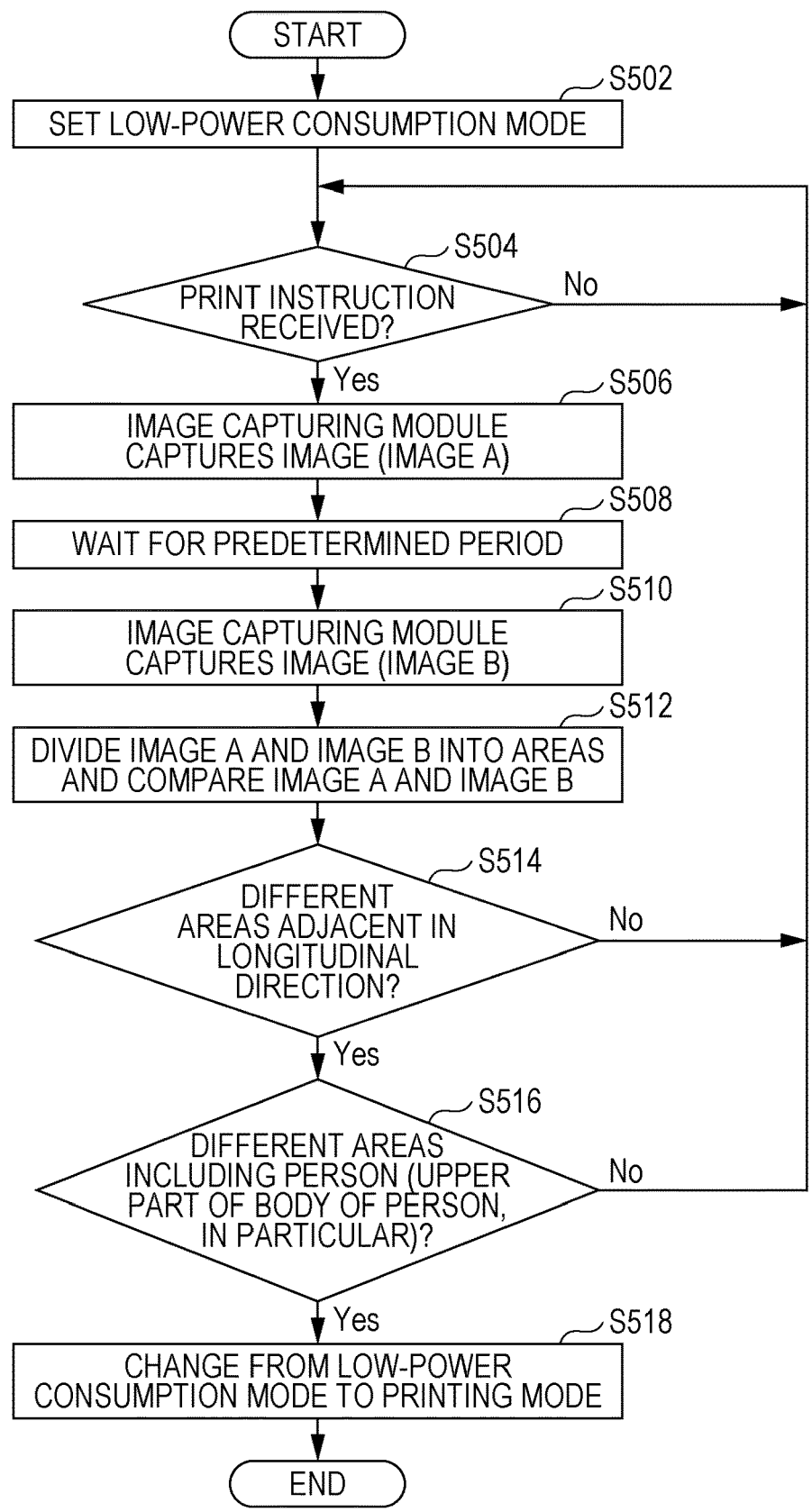
FIG. 5 is a flowchart illustrating an example process performed by the image processing apparatus according to the exemplary embodiment.

FIG. 5 is a flowchart illustrating an example process performed by the image processing apparatus 100 according to the exemplary embodiment. The processing of steps S502 to S514 is equivalent to the processing of steps S302 to S314, and the processing of step S518 is equivalent to the processing of step S316.

In step S502, the low-power consumption mode control module 140 sets the low-power consumption mode.

In step S504, it is determined whether the print instruction receiving module 110 has received a print instruction from one of the user terminals 200. If a print instruction has been received, the process proceeds to step S506. Otherwise, the image processing apparatus 100 waits for a print instruction to be received.

In step S506, the image capturing module 120 captures an image (image A).

In step S508, the image capturing module 120 waits for a predetermined period.

In step S510, the image capturing module 120 captures an image (image B).

In step S512, each of the image A and the image B is divided into areas and the image A and the image B are compared with each other.

In step S514, it is determined whether the different areas are adjacent in the longitudinal direction. If the different areas are adjacent in the longitudinal direction, the process proceeds to step S516. Otherwise, the process returns to step S504.

In step S516, it is determined whether the different areas include a person (in particular, the upper part of the body of a person). If the different areas include a person, the process proceeds to step S518. Otherwise, the process returns to step S504. In the example illustrated in FIG. 4B, it is determined whether the transition area 422 and the transition area 424, which are extracted as different areas, include a person. The determination of whether an image includes a person may be based on an existing technique for detecting a person's body. Alternatively, a face detection technique or a face image recognition technique may be used to recognize a face image in different areas, and it may be determined whether a user corresponding to the recognized face is the user who has issued the print instruction (the user from whom the print instruction is received in step S504). If both users are different, the process may return to step S504; if both users are identical, the process may proceed to step S518.

In step S518, the low-power consumption mode control module 140 changes from the low-power consumption mode to the printing mode.

Figure 6:
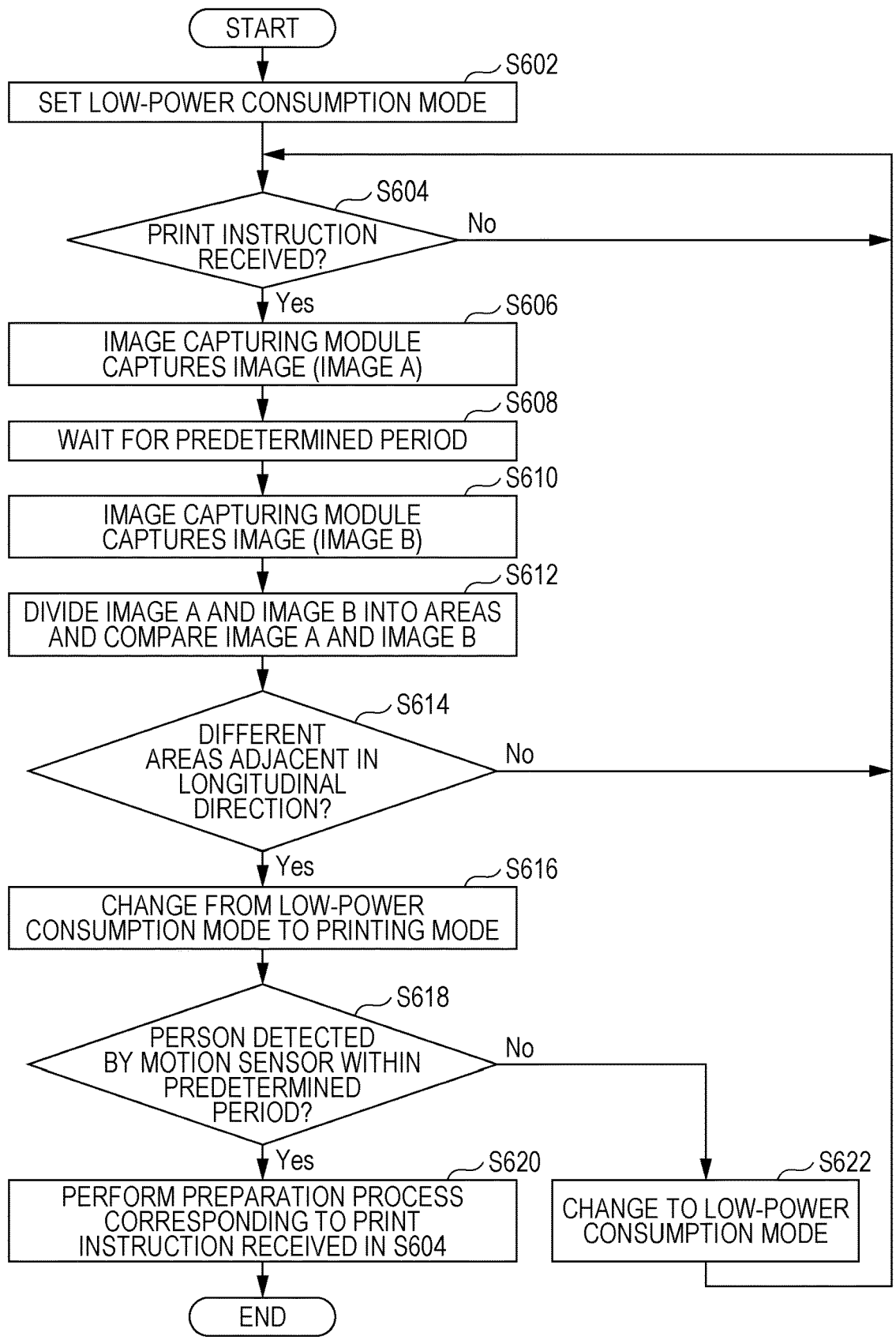
FIG. 6 is a flowchart illustrating an example process performed by the image processing apparatus according to the exemplary embodiment.

FIG. 6 is a flowchart illustrating an example process performed by the image processing apparatus 100 according to the exemplary embodiment. The processing of steps S602 to S616 is equivalent to the processing of steps S302 to S316.

In step S602, the low-power consumption mode control module 140 sets the low-power consumption mode.

In step S604, it is determined whether the print instruction receiving module 110 has received a print instruction from one of the user terminals 200. If a print instruction has been received, the process proceeds to step S606. Otherwise, the image processing apparatus 100 waits for a print instruction to be received.

In step S606, the image capturing module 120 captures an image (image A).

In step S608, the image capturing module 120 waits for a predetermined period.

In step S610, the image capturing module 120 captures an image (image B).

In step S612, each of the image A and the image B is divided into areas and the image A and the image B are compared with each other.

In step S614, it is determined whether different areas are adjacent in the longitudinal direction. If the different areas are adjacent in the longitudinal direction, the process proceeds to step S616. Otherwise, the process returns to step S604.

In step S616, the low-power consumption mode control module 140 changes from the low-power consumption mode to the printing mode.

In step S618, it is determined whether a motion sensor has detected a person within a predetermined period. If a person has been detected, the process proceeds to step S620. Otherwise, the process proceeds to step S622. The "predetermined period" may start upon detection of a person who is standing up (when "Yes" is determined in step S614) or upon receipt of a print instruction in step S604 although the measurement of time may be useless. Alternatively, the "predetermined period" may start when the image A is captured in step S606 or when the image B is captured in step S610, for example. The "predetermined period" is desirably longer than or equal to the time period taken for the user 210 to go to the image processing apparatus 100.

In step S620, a preparation process corresponding to the print instruction received in step S604 (such as a process for generating, on a memory, a print image from a document to be printed) is performed.

In step S622, the low-power consumption mode control module 140 changes to the low-power consumption mode, and then the process returns to step S604. Although a user is detected when standing up, the user does not approach the image processing apparatus 100. Thus, a process for returning to the low-power consumption mode is performed. The image processing apparatus 100, which has once entered the printing mode, returns to the low-power consumption mode faster than when the image processing apparatus 100 is not in use for a predetermined time. Thus, power consumption may be reduced.

Figure 7:
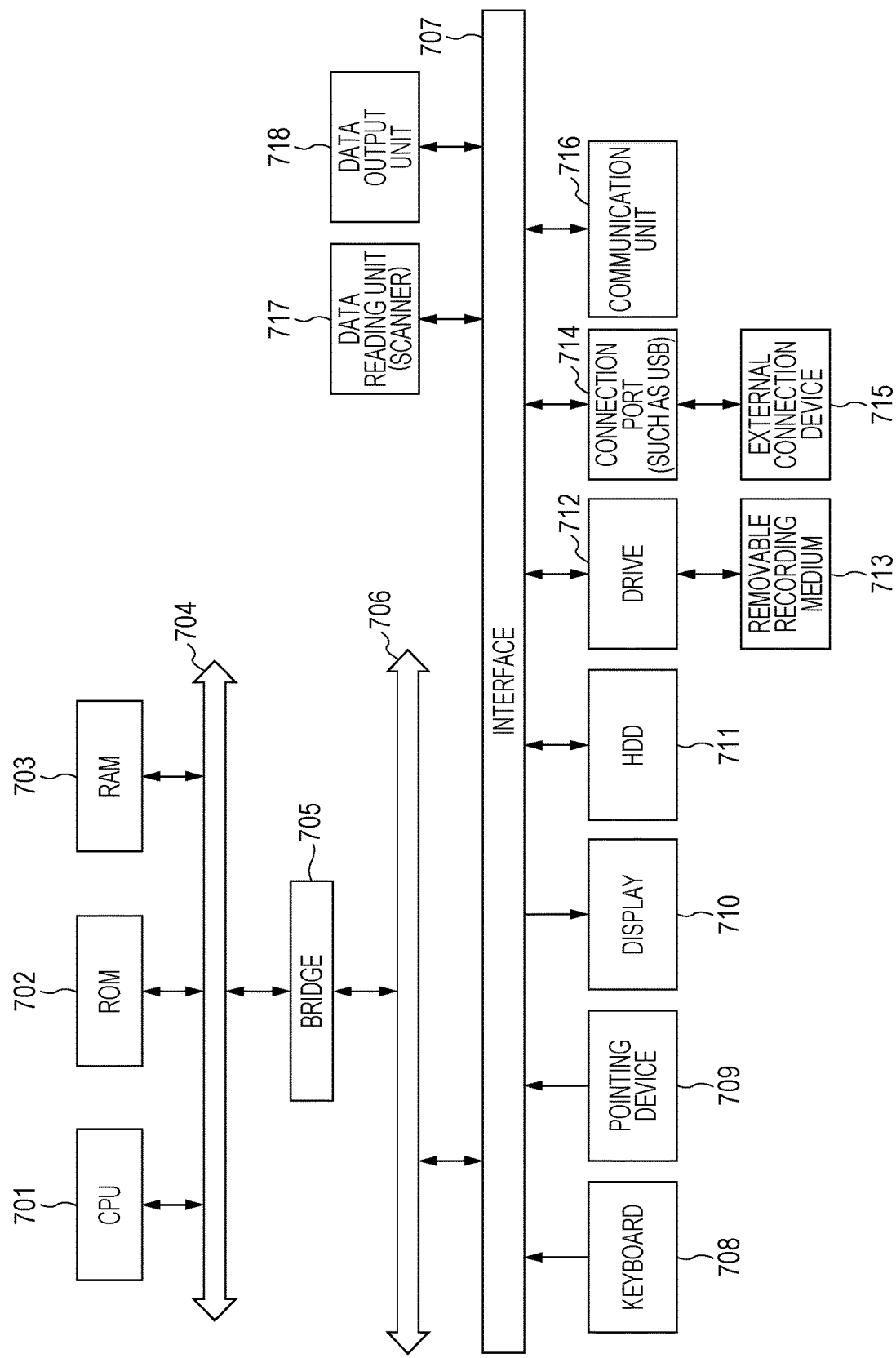
FIG. 7 is a block diagram illustrating an example hardware configuration of a computer that implements the image processing apparatus according to the exemplary embodiment.

An example hardware configuration of an image processing apparatus according to this exemplary embodiment will be described with reference to FIG. 7. The configuration illustrated in FIG. 7 is implemented by a personal computer (PC), for example. An example hardware configuration is illustrated that includes a data reading unit 717, such as a scanner, and a data output unit 718, such as a printer.

A CPU 701 is a controller that executes processing in accordance with a computer program describing the execution sequence of modules such as the various modules described in the exemplary embodiment described above, namely, the print instruction receiving module 110, the image capturing module 120, the detection module 130, the low-power consumption mode control module 140, and the image processing module 150.

A read only memory (ROM) 702 stores a program, computation parameters, and other data used by the CPU 701. A RAM 703 stores a program to be executed by the CPU 701 and parameters and the like that change as appropriate in accordance with the executed program. The CPU 701, the ROM 702, and the RAM 703 are connected to one another via a host bus 704 such as a CPU bus.

The host bus 704 is connected to an external bus 706, such as a Peripheral Component Interconnect/Interface (PCI) bus via a bridge 705.

A keyboard 708 and a pointing device 709, such as a mouse, are devices that are operated by an operator. A display 710, examples of which include a liquid crystal display device and a cathode ray tube (CRT), displays various information as text and/or image information. Alternatively, the display 710 may be a touch screen or any other device having the functions of both the pointing device 709 and the display 710. In this case, keyboard functions may not necessarily be implemented by using the keyboard 708, which are physically connected. A keyboard may be drawn on a screen (touch screen) by using software (such a keyboard is also referred to as a so-called software keyboard or on-screen keyboard) to implement keyboard functions.

A hard disk drive (HDD) 711 contains a hard disk (which may be a flash memory or the like). The HDD 711 drives the hard disk to record or reproduce information and a program to be executed by the CPU 701. The hard disk stores print instructions, captured images, and so on. The hard disk also stores other information such as various data and various computer programs.

A drive 712 reads data or a program recorded on a removable recording medium 713 placed in the drive 712, such as a magnetic disk, an optical disk, a magneto-optical disk, or a semiconductor memory, and provides the read data or program to the RAM 703 connected thereto via an interface 707, the external bus 706, the bridge 705, and the host bus 704. The removable recording medium 713 is also available as a data recording area.

A connection port 714 is a port to which an external connection device 715 is connected. The connection port 714 includes a connection part supporting a standard such as Universal Serial Bus (USB) or an Institute of Electrical and Electronics Engineers (IEEE) 1394. The connection port 714 is connected to the CPU 701 and so on via the interface 707, the external bus 706, the bridge 705, the host bus 704, and so on. A communication unit 716 is connected to a communication line to execute a process for data communication with external devices. The data reading unit 717 may be a scanner, for example, and executes a process for reading a document. The data output unit 718 may be a printer, for example, and executes a process for outputting document data.

The hardware configuration of the image processing apparatus illustrated in FIG. 7 illustrates an example configuration. The configuration according to this exemplary embodiment is not limited to the configuration illustrated in FIG. 7 and may be any configuration that is capable of implementing the modules described above in this exemplary embodiment. For example, some of the modules may be implemented as dedicated hardware (e.g., an application specific integrated circuit (ASIC), etc.), or other modules may be included in an external system and connected via a communication line. Alternatively, multiple systems each illustrated in FIG. 7 may be interconnected via a communication line so as to operate in cooperation with each other. In particular, the modules may be incorporated in a multifunction device or any other device such as a printer, a copying machine, or a facsimile machine.

The program described above may be stored in a recording medium to be provided or may be provided via a communication medium. In this case, for example, the program described above may be implemented as a "computer-readable recording medium storing the program".

The "computer-readable recording medium storing the program" refers to a recording medium readable by a computer and having the program recorded thereon, which is used for installing and executing the program, distributing the program, or any other purpose.

Examples of the recording medium include digital versatile discs (DVDs), such as discs based on standards created by the DVD Forum, namely, "DVD-R, DVD-RW, and DVD-RAM", and discs based on standards created by the DVD+RW Alliance, namely, "DVD+R and DVD+RW", compact discs (CDs), such as a compact disc read-only memory (CD-ROM), a CD-Recordable (CD-R) disc, and a CD-Rewritable (CD-RW) disc, Blu-ray Disc (registered trademark), a magneto-optical (MO) disk, a flexible disk (FD), a magnetic tape, a hard disk, a ROM, an electrically erasable programmable read-only memory (EEPROM (registered trademark)), a flash memory, a RAM, and a secure digital (SD) memory card.

All or part of the program described above may be recorded on the recording medium described above for storage or distribution, for example. Alternatively, all or part of the program described above may be transmitted via communication by using a transmission medium such as a wired network, a wireless communication network, or a combination thereof that is used for a communication architecture such as a local area network (LAN), a metropolitan area network (MAN), a wide area network (WAN), the Internet, an intranet, or an extranet, or may be carried on carrier waves.

Additionally, the program described above may be part or all of another program, or may be recorded on a recording medium together with a separate program. Alternatively, the program may be divided into pieces which are recorded on plural recording media. Moreover, the program may be recorded in any form that is restorable, such as in compressed or encrypted form.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a controller configured to
      detect a standing-up motion of a person after receipt of a print instruction; and
      change the image processing apparatus from a low-power consumption mode to a printing mode in response to detection of the standing-up motion, the printing mode being a ready-to-print mode; and
   a camera that captures a first image after receipt of the print instruction and captures a second image after a predetermined period elapses after capturing of the first image,
   wherein the controller compares the first image with the second image to detect the standing-up motion of the person.

2. The image processing apparatus according to claim 1, wherein the controller detects a standing-up motion of a person when one or more image portions in the second image are different from one or more corresponding image portions in the first image and are arranged vertically.

3. The image processing apparatus according to claim 2, wherein
the controller detects a standing-up motion of a person when the one or more different image portions include the person.

4. The image processing apparatus according to claim 1, wherein
the controller receives images from the camera to detect the standing-up motion, and
the person is in a field of view of the camera while the standing-up motion is detected.

5. A non-transitory computer readable medium storing a program causing a computer to execute a process for image processing, the process comprising:
causing a camera to capture a first image after receipt of a print instruction and capture a second image after a predetermined period elapses after capturing of the first image,
detecting a standing-up motion of a person after receipt of the print instruction by comparing the first image with the second image; and
changing from a low-power consumption mode to a printing mode in response to detection of the standing-up motion, the printing mode being a ready-to-print mode.

6. An image processing apparatus comprising:
means for capturing a first image after receipt of a print instruction and capturing a second image after a predetermined period elapses after capturing of the first image,
means for detecting a standing-up motion of a person after receipt of the print instruction by comparing the first image with the second image; and
means for changing from a low-power consumption mode to a printing mode in response to the detecting the standing-up motion, the printing mode being a ready-to-print mode.

* * * * *